(12) United States Patent
Morimoto (10) Patent No.: US 7,130,816 B2
(45) Date of Patent: Oct. 31, 2006

(54) DIGITAL DISTRIBUTION METHOD AND DIGITAL DISTRIBUTION SYSTEM

(76) Inventor: Nobuyoshi Morimoto, 29-10-106, Sakuragaoka-cho, Shibuya-ku, Tokyo (JP)

( * ) Notice: Subject to any disclaimer, the term of this patent is extended or adjusted under 35 U.S.C. 154(b) by 606 days.

(21) Appl. No.: 09/808,830

(22) Filed: Mar. 15, 2001

(65) Prior Publication Data

US 2001/0023412 A1   Sep. 20, 2001

(30) Foreign Application Priority Data

Mar. 17, 2000   (JP) ............... P2000-076742

(51) Int. Cl.
*G06Q 30/00* (2006.01)
(52) U.S. Cl. ............... 705/26; 705/51
(58) Field of Classification Search ............... 705/26, 705/27, 51; 380/4
See application file for complete search history.

(56) References Cited

U.S. PATENT DOCUMENTS

| | | | | |
|---|---|---|---|---|
| 5,708,709 A | * | 1/1998 | Rose ............... | 705/59 |
| 5,918,213 A | * | 6/1999 | Bernard et al. ............... | 705/26 |
| 6,633,877 B1 | * | 10/2003 | Saigh et al. ............... | 707/10 |
| 2003/0040962 A1 | * | 2/2003 | Lewis ............... | 705/14 |
| 2005/0071272 A1 | * | 3/2005 | Yoshioka et al. ............... | 705/51 |

OTHER PUBLICATIONS

Paschal, C., "The State, Columbia, S.C., Computer Column," Knight-Ridder Tribune Business News, Mar. 31, 1998.*

* cited by examiner

*Primary Examiner*—Nicholas D. Rosen
(74) *Attorney, Agent, or Firm*—Brenda O. Holmes; Kilpatrick Stockton LLP (57) ABSTRACT

Digital contents representing the entity of a product are incorporated in a control program, and the control program is transmitted from a vendor to a buyer over a network. The product is delivered from the vendor to the buyer after a desired delivery period has elapsed from the transmission. After the product is delivered, the control program disables the digital contents. Therefore, when the present invention is applied to the book business, the buyer can read the digital contents representing the entity of the book immediately after the buyer places an order for the book. After that, the buyer can get the book that will be delivered.

6 Claims, 9 Drawing Sheets

PERSONAL INFORMATION REGISTRATION PAGE 21

PERSONAL INFORMATION

- NAME ~210
- CREDIT CARD NUMBER ~211
- CARD EXPIRATION DATE ~212
- ADDRESS ~213
- TELEPHONE NUMBER ~214
- E-MAIL ~215

FIG.4

ITEM BROWSING PAGE 22

CATEGORY ⬜⬜⬜ 220

SEARCH — 221

ITEM
222

SELECT — 223

FIG.5

ORDER PAGE 23

ITEM ⎯230
DESIRED DELIVERY PERIOD ⎯231
DESIRED CONTENTS PART ⎯232

DELIVERY ADDRESS

233a ⎯ ☐ REGISTERED ADDRESS
233b ⎯ ☐ OTHER ADDRESS

⎯233c

PRICE ⎯234
SHIPPING CHARGE ⎯235
AMOUNT ⎯236

237 ⎯ [ OK ]   [ CANCEL ] ⎯238

FIG.7

ORDER PAGE 24

- ITEM ⎯ 240
- SHIPPING CHARGE ▽ ⎯ 241
- DESIRED CONTENTS PART ▽ ⎯ 242

DELIVERY ADDRESS

- 243a ⎯ ☐ REGISTERED ADDRESS
- 243b ⎯ ☐ OTHER ADDRESS
- ⎯ 243c

- PRICE ⎯ 244
- SHIPPING CHARGE ⎯ 245
- AMOUNT ⎯ 246

\* YOU WILL GET PRODUCT IN [ 249 ] DAYS

247 ⎯ [ OK ]     [ CANCEL ] ⎯ 248

FIG.9

ORDER PAGE 25

ITEM ⸺250
CONTENTS AVAILABILITY PERIOD ⸺251
DESIRED CONTENTS PART ⸺252

PRICE ⸺253

254⸺ OK      CANCEL ⸺255

DIGITAL DISTRIBUTION METHOD AND DIGITAL DISTRIBUTION SYSTEM

CROSS REFERENCE TO RELATED APPLICATION

This application claims benefit of priority under 35 U.S.C. § 119 to Japanese Patent Application No.2000-76742, filed on Mar. 17, 2000, the entire contents of which are incorporated by reference herein.

BACKGROUND OF THE INVENTION

1. Field of the Invention

The present invention relates to a digital distribution method and a digital distribution system that are applied to the distribution of books, documents, music CDs, and video DVDs.

2. Description of the Related Art

Recently, open networks such as the Internet have come into wide use around the world. This type of network allows customers to access various products on the network, and many new businesses have started.

One of well-known Internet businesses is a book sales business that accepts orders over the Internet and sells books. This business is now widely accepted by many buyers.

The problem with a conventional book sales business over the Internet is that, though an order for a book is sent and received between a vendor and a buyer in real time over the Internet, the ordered book is delivered to the buyer using a conventional distribution system. This means that the buyer must wait a few days until the book is delivered and, during that period, cannot read the book.

SUMMARY OF THE INVENTION

It is an object of the present invention to provide a digital distribution method and a digital distribution system that eliminate the inconveniences of the conventional system and that transmit the digital contents of the book over the Internet to allow the buyer to read the book immediately after he or she places an order without having to wait for the book to be delivered. The book itself is delivered from the vendor to the buyer within an allowable delivery period at a lower shipping cost. After a contents availability period that is longer than a desired delivery period between the transmission of the digital contents and the delivery of the book, a control program transmitted with the digital contents disables the digital contents to allow the vendor to control the termination of the digital contents. This digital distribution method and digital distribution system may also be applied to sales businesses that sell products other than books.

To achieve the above object, there is provided a digital distribution method for transmitting digital contents representing an entity of a product over a network and, subsequently, delivering the product, the digital distribution method comprising the steps of: incorporating the digital contents into a control program controlling the digital contents and transmitting the control program over the network; delivering the product after a predetermined period has elapsed after the transmission; and disabling the digital contents by the control program after a contents availability period has elapsed, the contents availability period being set to a time longer than the predetermined period.

To achieve the above object, there is provided a digital distribution method for transmitting digital contents representing an entity of a product over a network and, subsequently, delivering the product, the digital distribution method comprising the steps of: providing, by a product vendor, a plurality of product items for browsing over the network; selecting, by a product buyer, a desired item from a plurality of browsed items, specifying a desired delivery period for a delivery of the product item, and placing an order for the product over the network; incorporating, by the vendor, the digital contents into a control program controlling the digital contents and transmitting the control program to the buyer over the network in response to the order, the digital contents representing the entity of the product item selected by the buyer; delivering the product from the vendor to the buyer when the desired delivery period has elapsed from a time the order is placed; and disabling, by the control program, the digital contents when a contents availability period has elapsed, the contents availability period being set in the control program and set to a time longer than the desired delivery period.

To achieve the above object, there is provided a digital distribution method for transmitting digital contents representing an entity of a product over a network and, subsequently, delivering the product, the digital distribution method comprising the steps of: providing, by a product vendor, a plurality of product items for browsing over the network; selecting, by a product buyer, a desired item from a plurality of browsed items, specifying a shipping charge for a delivery of the product item, and placing an order for the product over the network; incorporating, by the vendor, the digital contents into a control program controlling the digital contents and transmitting the control program to the buyer over the network in response to the order, the digital contents representing the entity of the product item selected by the buyer; delivering the product from the vendor to the buyer when a required delivery period has elapsed from a time the order is placed, the required delivery period being determined based on the shipping charge; and disabling, by the control program, the digital contents when a contents availability period has elapsed, the contents availability period being set in the control program and set to a time longer than the required delivery period.

In a preferred embodiment of the present invention, the control program is transmitted with the digital contents incorporated in such a way that only the control program may process the digital contents and, when the transmission of the control program is completed, starts a time measuring operation of the contents availability period.

In a preferred embodiment of the present invention, when the contents availability period expires, the control program erases the digital contents or erases itself in conjunction with the digital contents.

In a preferred embodiment of the present invention, the product includes various books and documents, music CDs, and video DVDs.

To achieve the above object, there is provided a digital distribution system comprising a network, a server connected to the network and installed in a product vendor side, and a client computer connected to the network and installed in a product buyer side, wherein the server comprises: web pages comprising an item browsing page allowing a product buyer to browse a plurality of product items over the network for selecting a desired item therefrom and a product order page allowing the product buyer to specify, over the network, a desired delivery period or a shipping charge for a delivery of the selected product item; digital contents saving means for saving therein digital contents representing an entity of each product item; control program saving means for saving therein a control program which is transmitted with a contents availability period set and the digital contents incorporated at digital contents transmission time, wherein the control program disables the digital contents when the contents availability period expires after the transmission, the contents availability period being longer than the desired delivery period or than a required delivery period determined based on the shipping charge; transmission control means for controlling the transmission of the digital contents, the transmission control means calling the control program from the control program saving means in response to an order from the buyer and incorporating the digital contents, which is read from the digital contents saving means, into the control program for transmission to the buyer over the network; and delivery control means for controlling the delivery of the product, the delivery control means delivering the product from the vendor to the buyer when the desired delivery period or the required delivery period has elapsed from the transmission.

To achieve the above object, there is provided a digital distribution system comprising a network, a server connected to the network and installed in a product vendor side, and a client computer connected to the network and installed in a product buyer side, wherein the client computer comprises: a browser allowing web pages prepared in the server to be browsed over the network; wherein the web pages displayed on a screen of the client computer by the browser comprises: an item browsing page allowing a product buyer to browse a plurality of product items and prompting the product buyer to select a desired items therefrom; and a product order page allowing the product buyer to specify a desired delivery period or a shipping charge for a delivery of the selected product item and prompting the product buyer to place an order, wherein digital contents are incorporated into a control program controlling the digital contents in response to the order, transmitted from the vendor to the buyer over the network, and displayed on the screen of the client computer by the browser, the digital contents representing an entity of the product item selected by the buyer, and wherein, after the desired delivery period or a required delivery period determined based on the shipping charge has elapsed since the transmission and the product is delivered from the vendor to the buyer, the control program stops displaying the digital contents on the screen of the client computer when the contents availability period set in the control program has elapsed.

To achieve the above object, there is provided a digital distribution system comprising a network, a server connected to the network and installed in a product vendor side, and a client computer connected to the network and installed in a product buyer side, wherein the server comprises: web pages comprising an item browsing page allowing a product buyer to browse a plurality of product items over the network for selecting a desired item therefrom and a product order page allowing the product buyer to specify, over the network, a desired delivery period or a shipping charge for a delivery of the selected product item; digital contents saving means for saving therein digital contents representing an entity of each product item; control program saving means for saving therein a control program which is transmitted with a contents availability period set and the digital contents incorporated at digital contents transmission time, wherein the control program disables the digital contents when the contents availability period expires after the transmission, the contents availability period being longer than the desired delivery period or than a required delivery period determined based on the shipping charge; transmission control means for controlling the transmission of the digital contents, the transmission control means calling the control program from the control program saving means in response to an order from the buyer and incorporating the digital contents, which is read from the digital contents saving means, into the control program for transmission to the buyer over the network; and delivery control means for controlling the delivery of the product, the delivery control means delivering the product from the vendor to the buyer when the desired delivery period or the required delivery period has elapsed from the transmission, wherein the client computer comprises: a browser allowing the web pages to be browsed on a screen over the network; wherein the digital contents are incorporated into the control program in response to the order, transmitted from the vendor to the buyer over the network, and displayed on the screen of the client computer by the browser, the digital contents representing the entity of the product item selected by the buyer, and wherein, after the desired delivery period or the required delivery period has elapsed from the transmission and the product is delivered from the vendor to the buyer, the control program stops displaying the digital contents on the screen of the client computer when the contents availability period set in the control program has elapsed.

In a preferred embodiment of the present invention, when the desired delivery period has elapsed after the transmission, the control program erases the digital contents or erases itself in conjunction with the digital contents to prevent the digital contents from being displayed on the screen of the client computer.

To achieve the above object, there is provided a digital contents transmission method for transmitting digital contents representing an entity of a product over a network, the digital transmission method comprising the steps of: providing, by a product vendor, a plurality of product items for browsing over the network; selecting, by a product buyer, a desired item from a plurality of browsed items, specifying a desired contents availability period for the product item, and placing an order for the product over the network; incorporating, by the vendor, the digital contents into a control program controlling the digital contents and transmitting the control program to the buyer over the network in response to the order, the digital contents representing the entity of the product item selected by the buyer; and disabling, by the control program, the digital contents when the contents availability period has elapsed, the contents availability period being set in the control program.

The nature, principle and utility of the invention will become more apparent from the following detailed description when read in conjunction with the accompanying drawings.

DESCRIPTION OF THE PREFERRED EMBODIMENTS

An embodiment of the present invention will be described below with reference to the accompanying drawings.

Figure 1:
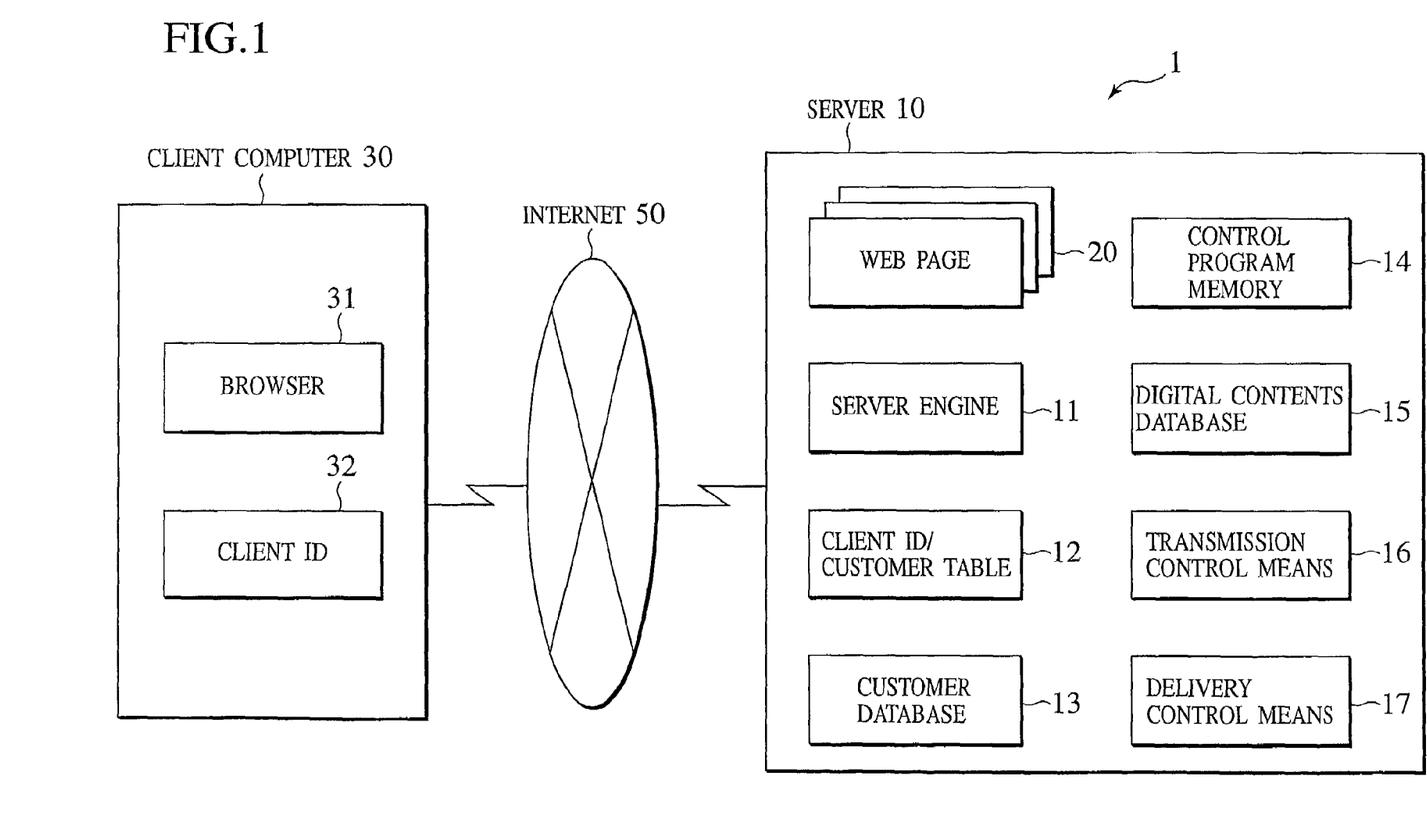
FIG. 1 is a block diagram showing an embodiment of a digital distribution system.

FIG. 1 is a block diagram showing an embodiment of a digital distribution system according to the present invention. The term "digital distribution" used in the description of the present invention refers to a distribution mode in which the digital contents of a product are first transmitted over the network and then the product itself is delivered, that is, the transmission of the digital contents and the delivery of the product are "seamlessly" implemented. A digital distribution system 1 shown in FIG. 1 is suitable for a business that deals in books.

The digital distribution system 1 that deals in books comprises a server 10 installed in the site of a vendor who accepts book orders and sell books and a client computer 30 (only one client computer shown in the figure) installed in the sites of many buyers who place orders for books and buy the books. The server and the client computers are connected via the Internet 50 for communication.

To accept orders and sell books, the server 10 comprises a server engine 11, a client ID/customer table 12, a customer database 13, a control program memory 14, a digital contents database 15, transmission control means 16, delivery control means 17, and web pages 20.

In response to an access request from one of client computers 30, the server engine 11 supplies one of many web pages 20 according to the request, searches the client ID/customer table 12 for the customer of the client computer 30, and searches the customer database 13 for information on the customer.

Figure 3:
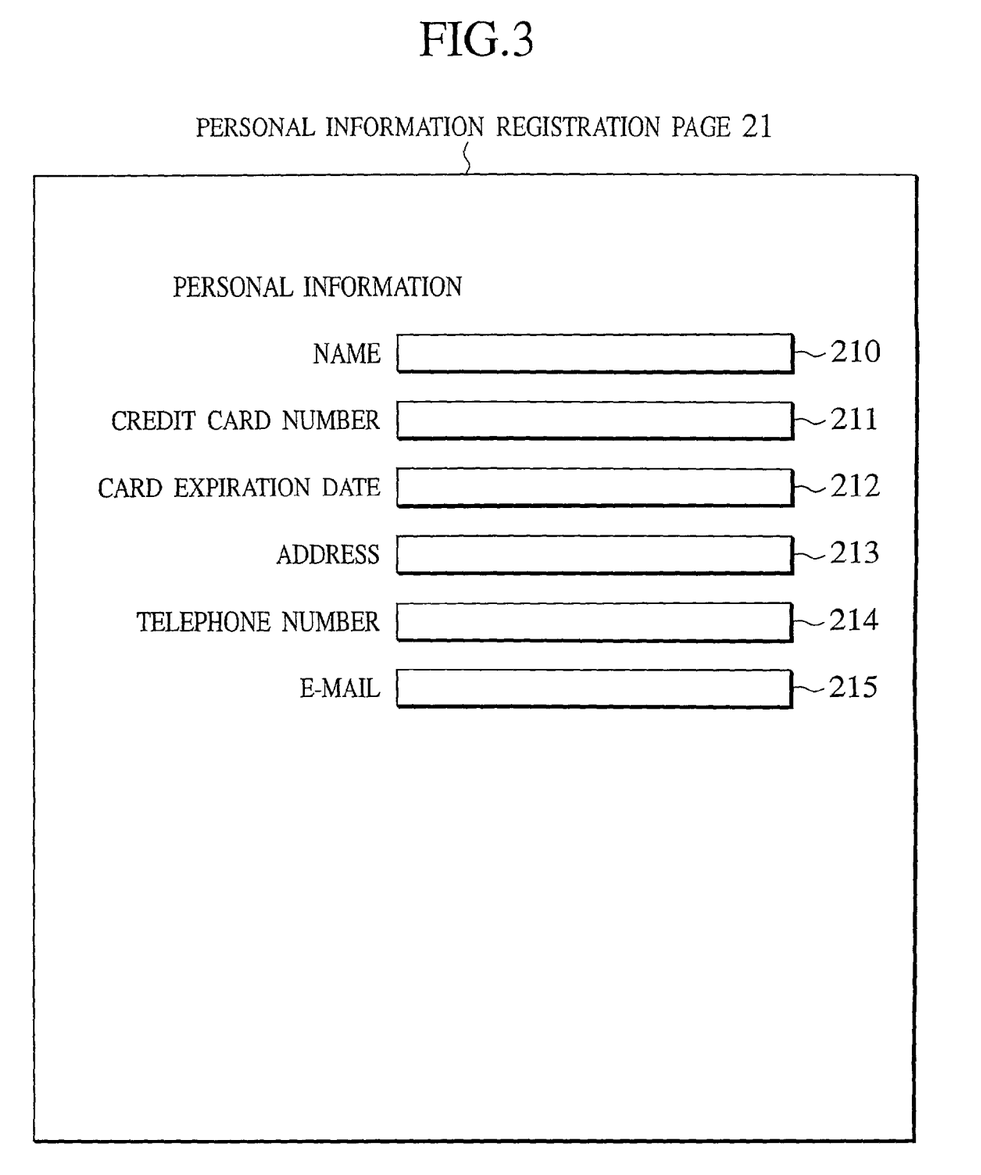
FIG. 3 is a diagram showing an example of a personal information registration page.

The web pages 20 include many pages—a personal information registration page 21, an item browsing page 22, order pages 23, 24 . . . , and so on. The personal information registration page 21 is used by a buyer, who accesses the vendor's site for selecting and buying a desired book from many books prepared there, to register personal information before buying the book. As shown in FIG. 3, the personal information registration page 21 comprises a name entry field 210 in which the buyer enters his or her name, a credit card number entry field 211 in which a credit card number is entered, a card expiration date field 212 in which the expiration date of the credit card is entered, an address entry field 213 in which the buyer's address is entered, a telephone number entry field 214 in which the telephone number is entered, and an e-mail entry field 215 in which the e-mail address is entered.

Figure 4:
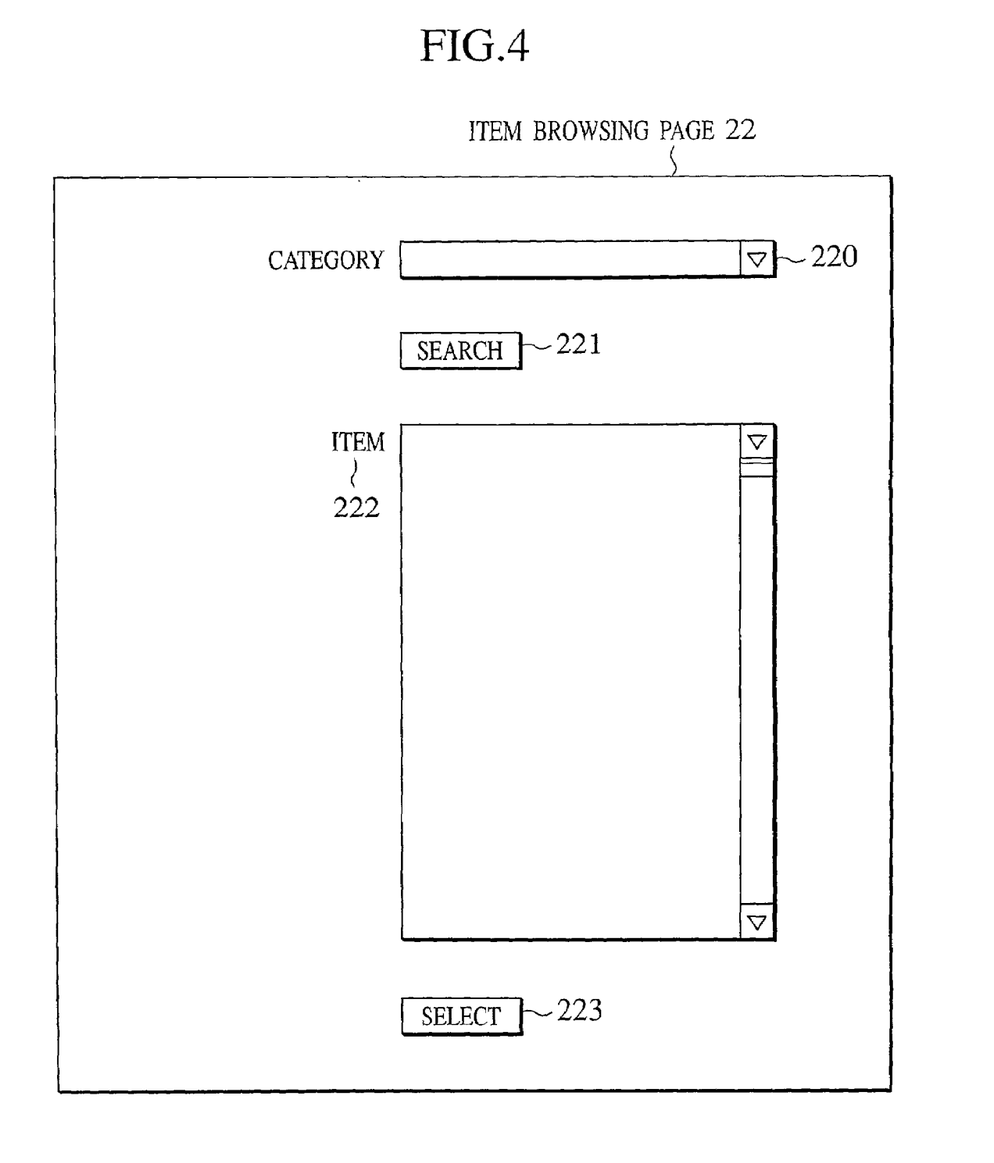
FIG. 4 is a diagram showing an example of an item browsing page.

The item browsing page 22 is used by a buyer, who accesses the vendor's site, to search the books to be sold at the site for a desired book item. As shown in FIG. 4, this page comprises a category display field 220 in which the categories of books such as literature, history, non-fiction, and so on are displayed in the pull-down menu, a Search button 221, a scrollable item display field 222 in which, after the selection of a category from those displayed, the book items (book names, and the like) of the selected category are displayed in a list form, and a Select button 223.

Figure 5:
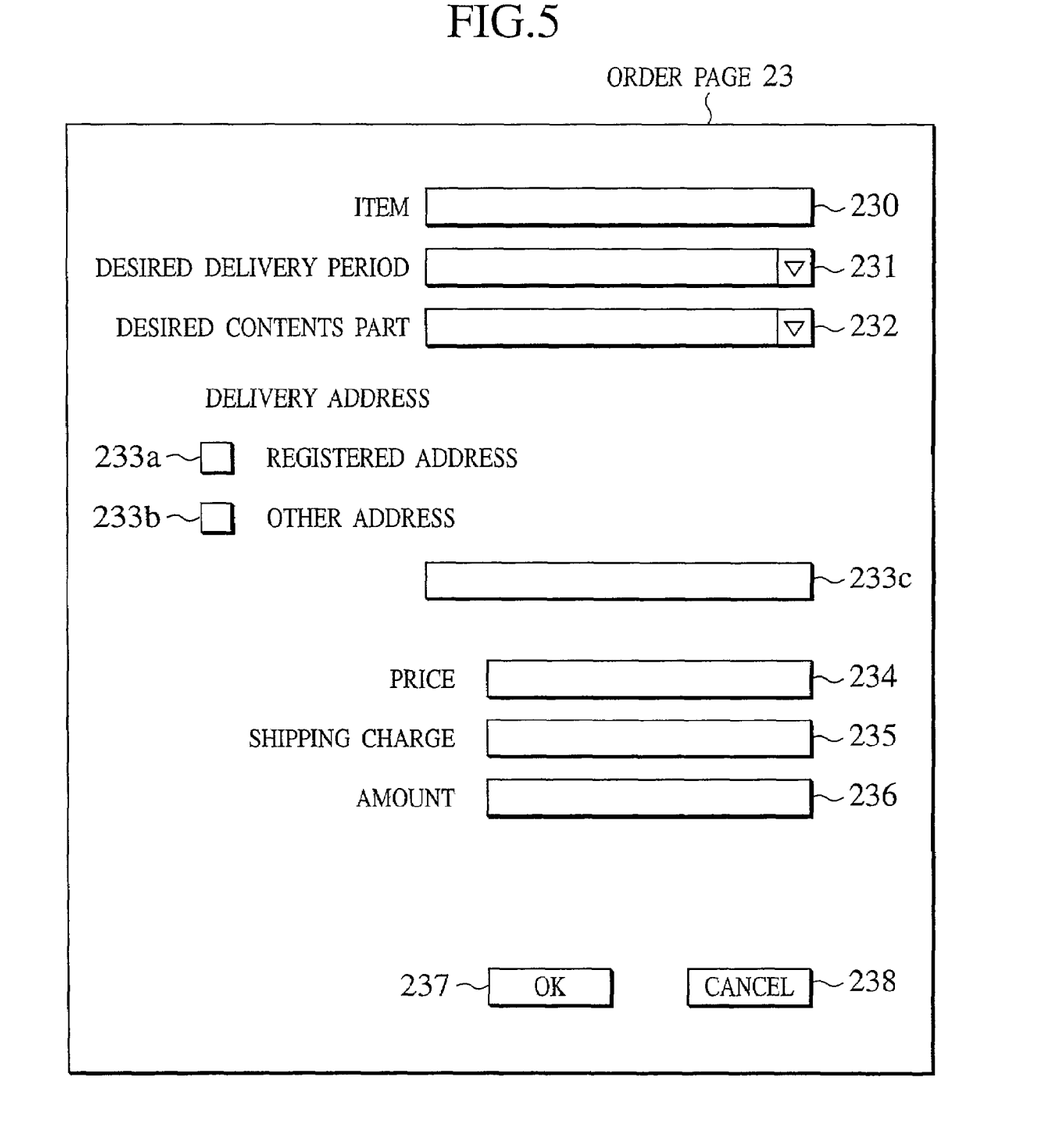
FIG. 5 is a diagram showing an example of an order page corresponding to the operation shown in FIG. 2.

The order page is used by a buyer to place an order for a book item the buyer has selected. FIG. 5 shows an example of the order page 23 with which the buyer specifies the desired delivery period of the book he or she has decided to buy. As shown in FIG. 5, the order page 23 comprises an item display field 230 in which the book item selected in the item browsing page 22 is automatically displayed, a desired delivery period display field 231 in which a plurality of predetermined desired delivery periods are displayed in the pull-down menu to allow the buyer to specify a desired delivery period during which the book item is to be delivered, a desired contents part display field 232 in which, when transmitting the digital contents of the book item, a plurality of predetermined desired contents parts (including all) are displayed in the pull-down menu to allow the buyer to specify which part to transmit, delivery address display fields 233 (233a, 233b, 233c) in which the address to which the book item is to be delivered is displayed, a price display field 234 in which the price of the book item is displayed, a shipping charge display field 235 in which the shipping charge of the book item is displayed, an amount display field 236 in which the amount is displayed, an OK button 237, and a Cancel button 238.

Figure 7:
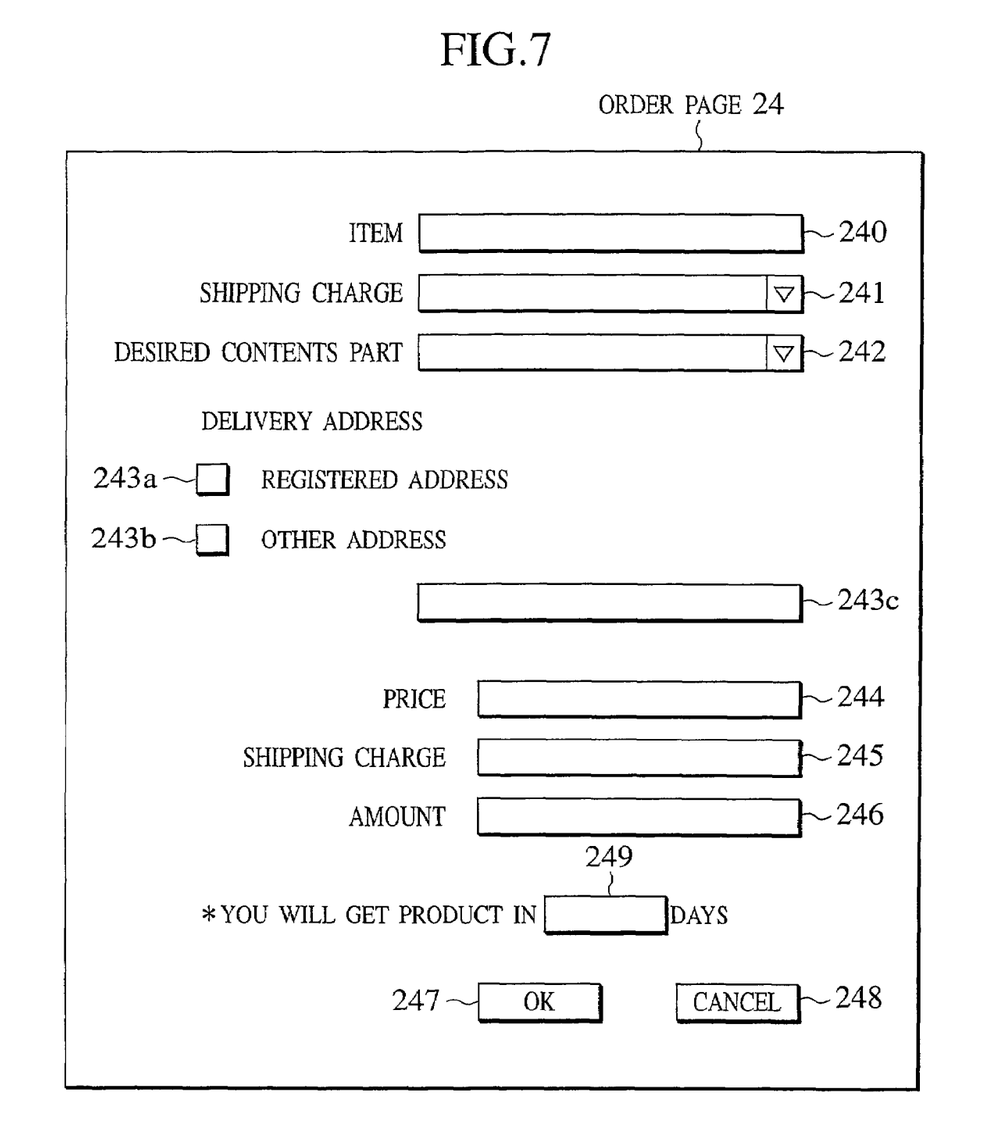
FIG. 7 is a diagram showing an example of an order page corresponding to the operation shown in FIG. 6.

FIG. 7 shows another order page 24 that allows a buyer to specify the shipping charge of a book the buyer is to buy. As shown in FIG. 7, instead of the desired delivery period display field 231 provided in the order page 23 shown in FIG. 5, this order page 24 has a shipping charge display field 241 in which a plurality of predetermined shipping charges are displayed in the pull-down menu to allow the buyer to specify the shipping charge of the selected book item. Also provided in this order page is a required delivery period display field 249 in which the required delivery period determined based on the shipping charge specified by the buyer is displayed. Because the other fields of this order page are similar to those of the order page 23 shown in FIG. 5, the value of 10 is added to each reference number shown in FIG. 5. In the order page 24, the shipping charge specified by the buyer and the required delivery period determined based on the shipping charge are displayed in an interlocked manner. The lower the specified shipping charge, the longer the required delivery period. For example, a buyer who doesn't care if the required delivery period is long may specify a free shipping charge.

Figure 9:
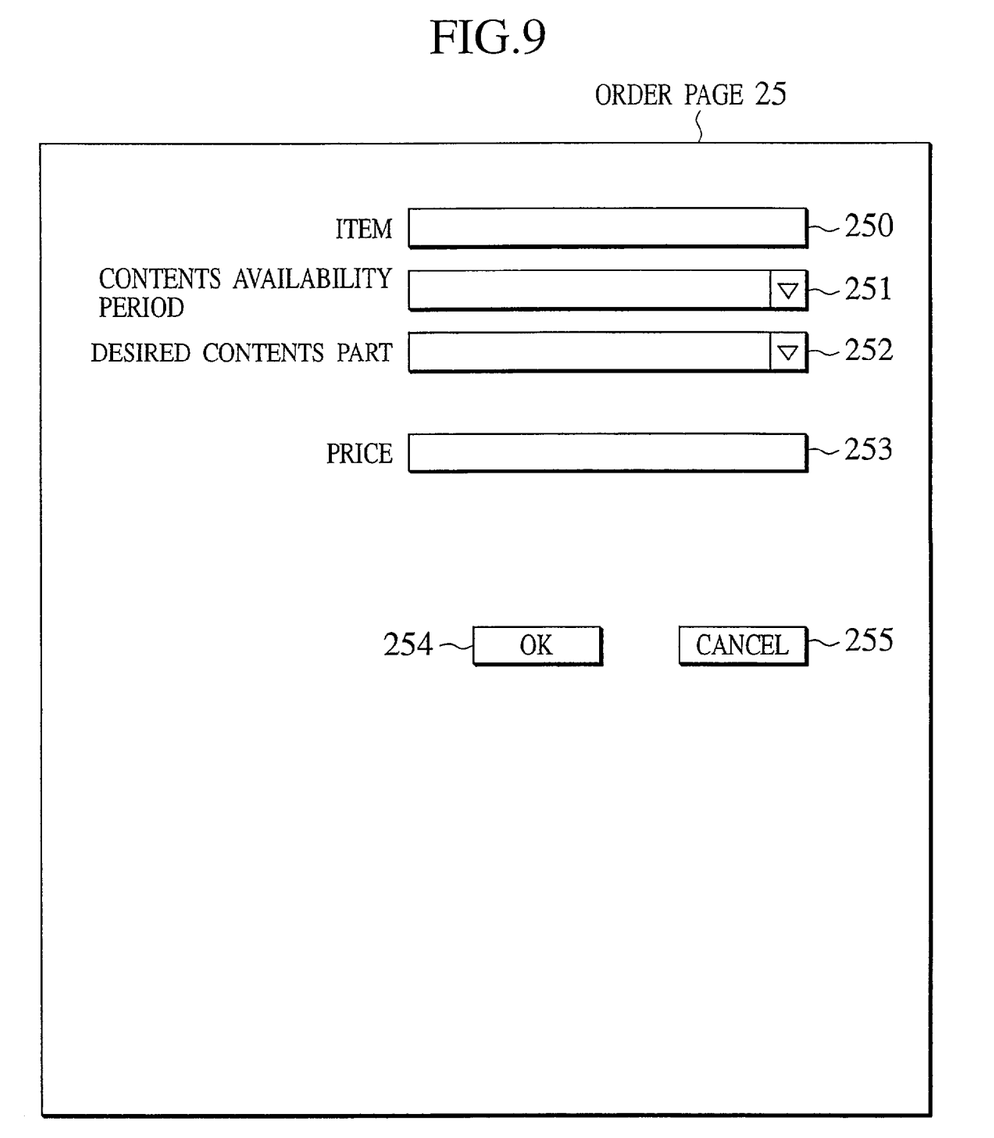
FIG. 9 is a diagram showing an example of an order page corresponding to the operation shown in FIG. 8.

FIG. 9 shows still another order page 25 used by a buyer to order, not a book itself, but only the digital contents of the book. As shown in FIG. 9, the order page 25 has an item display field 250, a contents availability period display field 251 in which a plurality of predetermined contents availability periods are displayed in the pull-down menu to allow the buyer to specify the desired contents availability period of the digital contents of the book item, a desired contents part display field 252, a price display field 253, an OK button 254, and a Cancel button 255.

When the server 10 receives an order for a book from the client computer 30, the transmission control means 16 calls a control program from the control program memory 14 and sets an appropriate contents availability period in the control program. At the same time, the transmission control means 16 reads the digital contents of the book from the digital contents database 15, includes the digital contents into the control program, and transmits the control program to the client computer 30. In this case, when the buyer specifies a desired delivery period of the book, the contents availability period is set to a period of time longer than the desired delivery period that is specified. When the buyer specifies a shipping charge of the book, the contents availability period is set to a period of time longer than the required delivery period determined based on the previously-prepared correspondence table containing a correspondence between shipping charges and required delivery periods. When the buyer specifies a contents availability period of the digital contents of the book, the contents availability period is set to the specified contents availability period. The control program in which the contents availability period is set as described above, once transmitted to the client computer 30, starts measuring the time of the contents availability period.

On the other hand, after the control program is transmitted and before the contents availability period expires, the book corresponding to the digital contents is delivered from the vendor to the buyer under control of the delivery control means 17. When the buyer specifies a desired delivery period, the book is delivered when the desired delivery period has elapsed. When the buyer specifies a shipping charge, the book is delivered when the required delivery period determined based on the shipping charge has elapsed. In either case, the book is delivered after the control program is transmitted and before the contents availability period expires. When the contents availability period expires, the digital contents are erased according to the predetermined program or the control program as well as the digital contents is erased.

The client computer 30 comprises a browser 31 and a client ID 32. The browser 31 in the client computer 30 requests the server 10 via the Internet 50 to send data and reads the data from the server 10 for display on the screen. The client ID 32 is an ID assigned by the server 10 when the client computer 30 accesses the server 10 for the first time. When the client computer 30 accesses the server 10 thereafter, the server 10 can identify the client computer 30 with the client ID 32.

Next, the operation of the above embodiment with a desired delivery period specified will be described with reference to FIG. 2.

First, when the buyer uses the client computer 30 to access the vendor's site (step S1), the web page 20 of the server 10 is displayed on the screen of the client computer 30. When ordering a book, the buyer uses the item browsing page 22 (shown in FIG. 4) displayed on the screen of the client computer 30. On this screen, the buyer selects a desired item from a plurality of book items in the Item display field 222 displayed in response to the selected category and clicks the Select button 223 (step S2). Then, the screen of the client computer 30 changes to the order page 23 shown in FIG. 5.

The buyer uses the order page 23 (shown in FIG. 5) displayed on the screen of the client computer 30 to specify the desired delivery period 231 of the book. The buyer also specifies the desired contents part 232 of the digital contents and clicks the OK button 237 (step S3). Clicking the OK button 237 sends the order, which is issued from the buyer to the vendor, to the server 10 over the Internet 50.

In response to the request from the client computer 30, the transmission control means 16 in the server 10 first calls the control program from the control program memory 14. The transmission control means 16 sets, in the control program, a contents availability period that is longer than the desired delivery period of the book specified by the buyer (step S11).

Then, from the digital contents database 15, the control program reads the digital contents of the book ordered by the buyer and incorporates them into itself so that only the control program can process the digital contents. The control program, into which the digital contents have been incorporated, is transmitted by the transmission control means 16 to the client computer 30 via the Internet 50 (step S12).

When the control program is transmitted from the server 10 to the client computer 30, the time-measuring operation starts to measure the elapsed time of the contents availability period that is set in the control program. Until the contents availability period expires (NO in step S21), the control program is in the wait state and executes processing in response to an operation request given by the buyer to the control program via the client computer 30 (step S22). For example, when the buyer starts the control program via the client computer 30, the control program displays the incorporated digital contents (contents of the book) on the screen of the client computer 30. When the buyer turns a page with a mouse or a key, the control program turns the page of the digital contents (contents of the book).

Therefore, the buyer can start and use the control program to read the digital contents (contents of the book) on the screen of the client computer 30. In addition, until the contents availability period that is set in the control program expires, the buyer can repeatedly read the digital contents (contents of the book) as often as he or she wishes even if the client computer 30 is turned on and off every day.

On the other hand, if the desired delivery period specified by the buyer has elapsed before the contents availability period that is set in the control program expires, the book corresponding to the digital contents is delivered from the vendor to the buyer under control of the delivery control means 17. That is, when the contents availability period that is set in the control program has elapsed (YES in step S21), the book should have already been delivered (step S23). When the contents availability period that is set in the control program has elapsed (YES in step S21), the control program erases the digital contents based on a predetermined program or erases the control program itself as well as the digital contents (step S24). Therefore, the digital contents incorporated in the control program become unavailable for use thereafter. At this time, the control program can automatically generate erase confirmation data and automatically send this data to the server 10 over the Internet 50.

Next, the operation of the above embodiment with a shipping charge specified will be described with reference to the flowchart shown in FIG. 6.

First, when the buyer uses the client computer 30 to access the vendor's site (step S101), the web page 20 of the server 10 is displayed on the screen of the client computer 30. When ordering a book, the buyer uses the item browsing page 22 (shown in FIG. 4) displayed on the screen of the client computer 30. On this screen, the buyer selects a desired item from a plurality of book items in the item display field 222 displayed in response to the selected category and clicks the Select button 223 (step S102). Then, the screen of the client computer 30 changes to the order page 24 shown in FIG. 7.

The buyer uses the order page 24 (shown in FIG. 7) displayed on the screen of the client computer 30 to specify the shipping charge 241 of the book. The buyer also specifies the desired contents part 242 of the digital contents and clicks the OK button 247 (step S103). When the buyer specifies the shipping charge 241, the required delivery period that changes according to the shipping charge specified by the buyer is displayed in the required delivery period display field 249. Therefore, while checking the delivery period displayed in the required delivery period display field 249, the buyer may specify even a free shipping charge if he or she does not care if it takes long. Clicking the OK button 247 sends the order, which is issued from the buyer to the vendor, to the server 10 over the Internet 50.

In response to the request from the client computer 30, the transmission control means 16 in the server 10 first calls the control program from the control program memory 14. The transmission control means 16 sets a contents availability period in the control program. This contents availability period is set to a period of time longer than the time determined according to the previously-prepared correspondence table containing a correspondence between shipping charges and required delivery periods, based on the shipping charge specified by the buyer (step S111).

Then, from the digital contents database 15, the control program reads the digital contents of the book ordered by the buyer and incorporates them into itself so that only the control program can process the digital contents. The control program, into which the digital contents have been incorporated, is transmitted by the transmission control means 16 to the client computer 30 via the Internet 50 (step S112).

When the control program is transmitted from the server 10 to the client computer 30, the time-measuring operation starts to measure the elapsed time of the contents availability period that is set in the control program. Until the contents availability period expires (NO in step S121), the control program is in the wait state and executes processing in response to an operation request given by the buyer via the client computer 30 (step S122). For example, when the buyer starts the control program via the client computer 30, the control program displays the incorporated digital contents (contents of the book) on the screen of the client computer 30. When the buyer turns a page with a mouse or a key, the control program turns the page of the digital contents (contents of the book).

Therefore, the buyer can start and use the control program to read the digital contents (contents of the book) on the screen of the client computer 30. In addition, until the contents availability period that is set in the control program expires, the buyer can repeatedly read the digital contents (contents of the book) as often as he or she wishes even if the client computer 30 is turned on and off every day.

On the other hand, if the required delivery period determined by the shipping charge specified by the buyer has elapsed before the contents availability period that is set in the control program expires, the book corresponding to the digital contents is delivered from the vendor to the buyer under control of the delivery control means 17. That is, when the contents availability period that is set in the control program has elapsed (YES in step S121), the book should have already been delivered (step S123). When the contents availability period that is set in the control program has elapsed (YES in step S121), the control program erases the digital contents based on a predetermined program or erases the control program itself as well as the digital contents (step S124). Therefore, the digital contents incorporated in the control program become unavailable for use thereafter. At this time, the control program can automatically generate erase confirmation data and automatically send this data to the server 10 over the Internet 50.

Next, the operation of the above embodiment in which digital contents are ordered will be described with reference to the flowchart shown in FIG. 8.

First, when the buyer uses the client computer 30 to access the vendor's site (step S201), the web page 20 of the server 10 is displayed on the screen of the client computer 30. When ordering the digital contents of a book, the buyer uses the item browsing page 22, shown in FIG. 4, displayed on the screen of the client computer 30. On this screen, the buyer selects a desired item from a plurality of book items in the item display field 222 displayed in response to the selected category and clicks the Select button 223 (step S202). Then, the screen of the client computer 30 changes to the order page 25 shown in FIG. 9.

The buyer uses the order page 25 (shown in FIG. 9) displayed on the screen of the client computer 30 to specify the contents availability period 251 of the digital contents. The buyer also specifies the desired contents part 252 of the digital contents and clicks the OK button 254 (step S203). Clicking the OK button 254 sends the order, which is issued from the buyer to the vendor, to the server 10 over the Internet 50.

In response to the request from the client computer 30, the transmission control means 16 in the server 10 first calls the control program from the control program memory 14. The transmission control means 16 sets the contents availability period, specified by the buyer, in the control program (step S211).

Then, from the digital contents database 15, the control program reads the digital contents ordered by the buyer and incorporates them into itself so that only the control program can process the digital contents. The control program, into which the digital contents have been incorporated, is transmitted by the transmission control means 16 to the client computer 30 via the Internet 50 (step S212).

When the control program is transmitted from the server 10 to the client computer 30, the time-measuring operation starts to measure the elapsed time of the contents availability period that is set in the control program. Until the contents availability period expires (NO in step S221), the control program is in the wait state and executes processing in response to an operation request given by the buyer via the client computer 30 (step S222). For example, when the buyer starts the control program via the client computer 30, the control program displays the incorporated digital contents (contents of the book) on the screen of the client computer 30. When the buyer turns a page with a mouse or a key, the control program turns the page of the digital contents (contents of the book).

Therefore, the buyer can start and use the control program to read the digital contents (contents of the book) on the screen of the client computer 30. In addition, until the contents availability period that is set in the control program expires, the buyer can repeatedly read the digital contents (contents of the book) as often as he or she wishes even if the client computer 30 is turned on and off every day.

When the contents availability period that is set in the control program has elapsed (YES in step S221), the control program erases the digital contents based on a predetermined program or erases the control program itself as well as the digital contents (step S223). Therefore, the digital contents incorporated in the control program become unavailable for use thereafter. At this time, the control program can automatically generate erase confirmation data and automatically send this data to the server 10 over the Internet 50.

If it takes relatively long to transmit all digital contents, for example, when the book has a large volume, the contents of the book may be divided into several parts with each part incorporated in a control program. This makes it possible to start reading the transmitted digital contents without having to wait until the whole book is transmitted. Moreover, the digital contents of a book may be not only characters but also maps and pictures.

Figure 2:
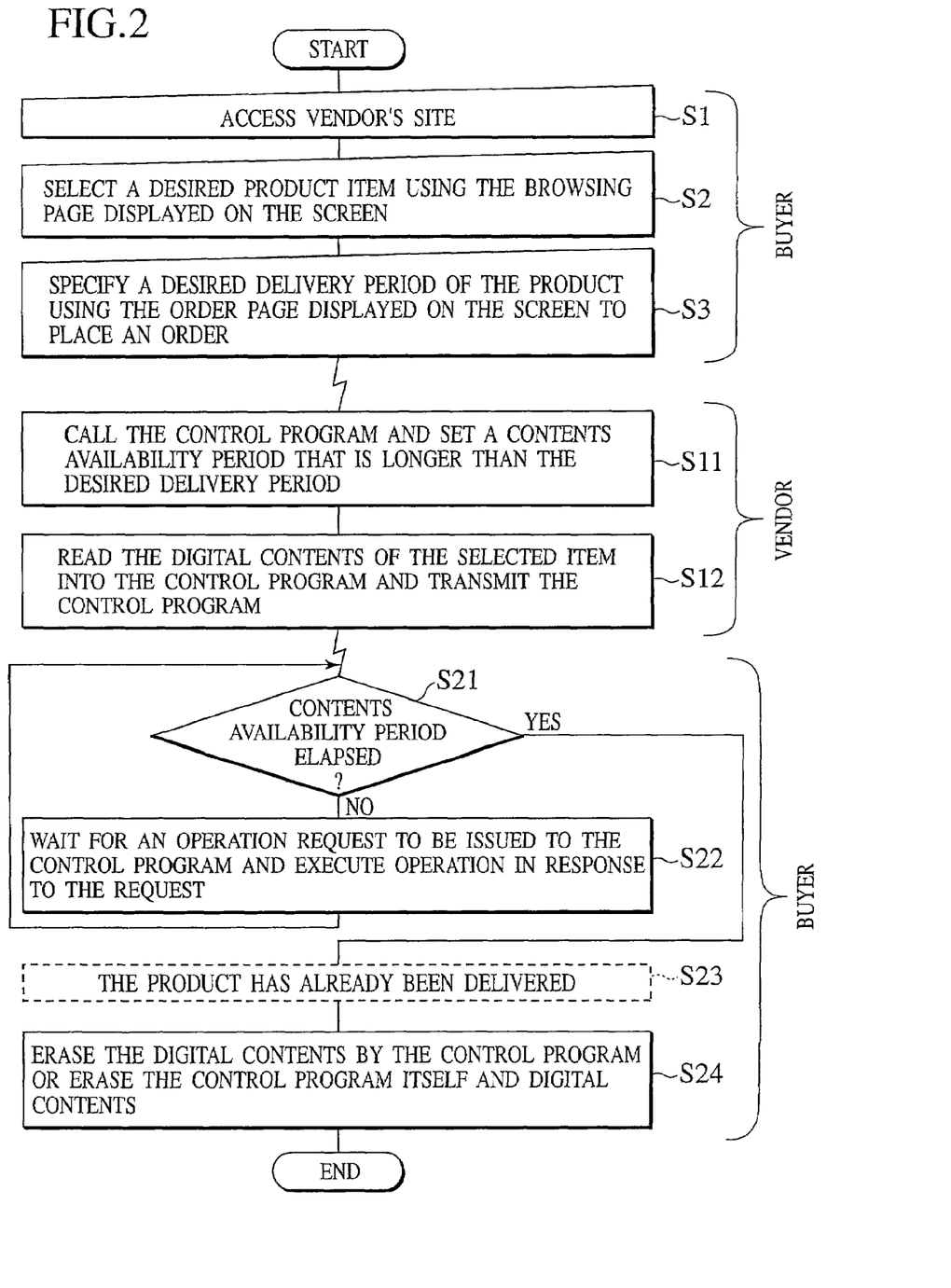
FIG. 2 is a flowchart showing an example of the operation of the digital distribution system.
Figure 6:
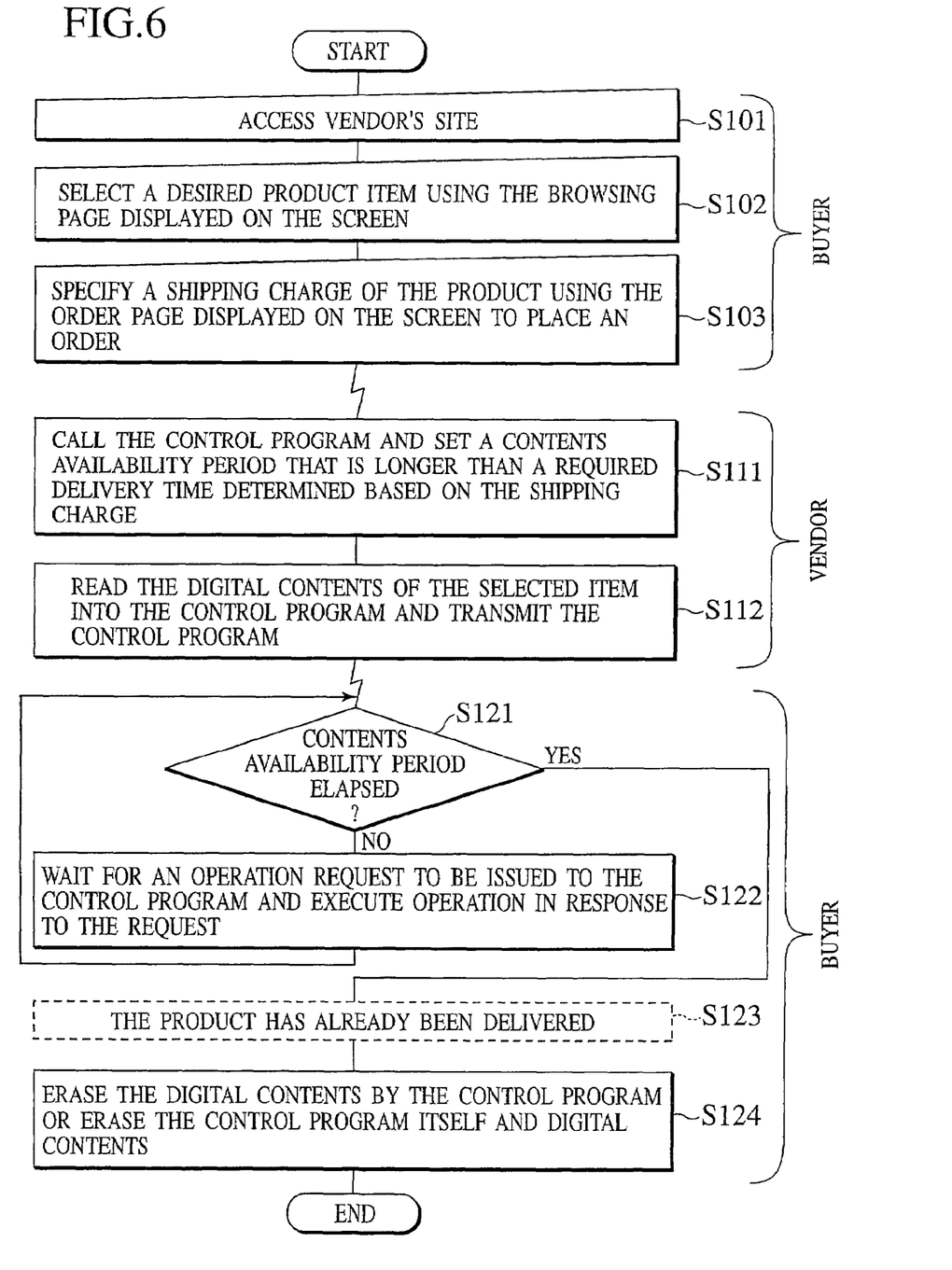
FIG. 6 is a flowchart showing another example of the operation of the digital distribution system.
Figure 8:
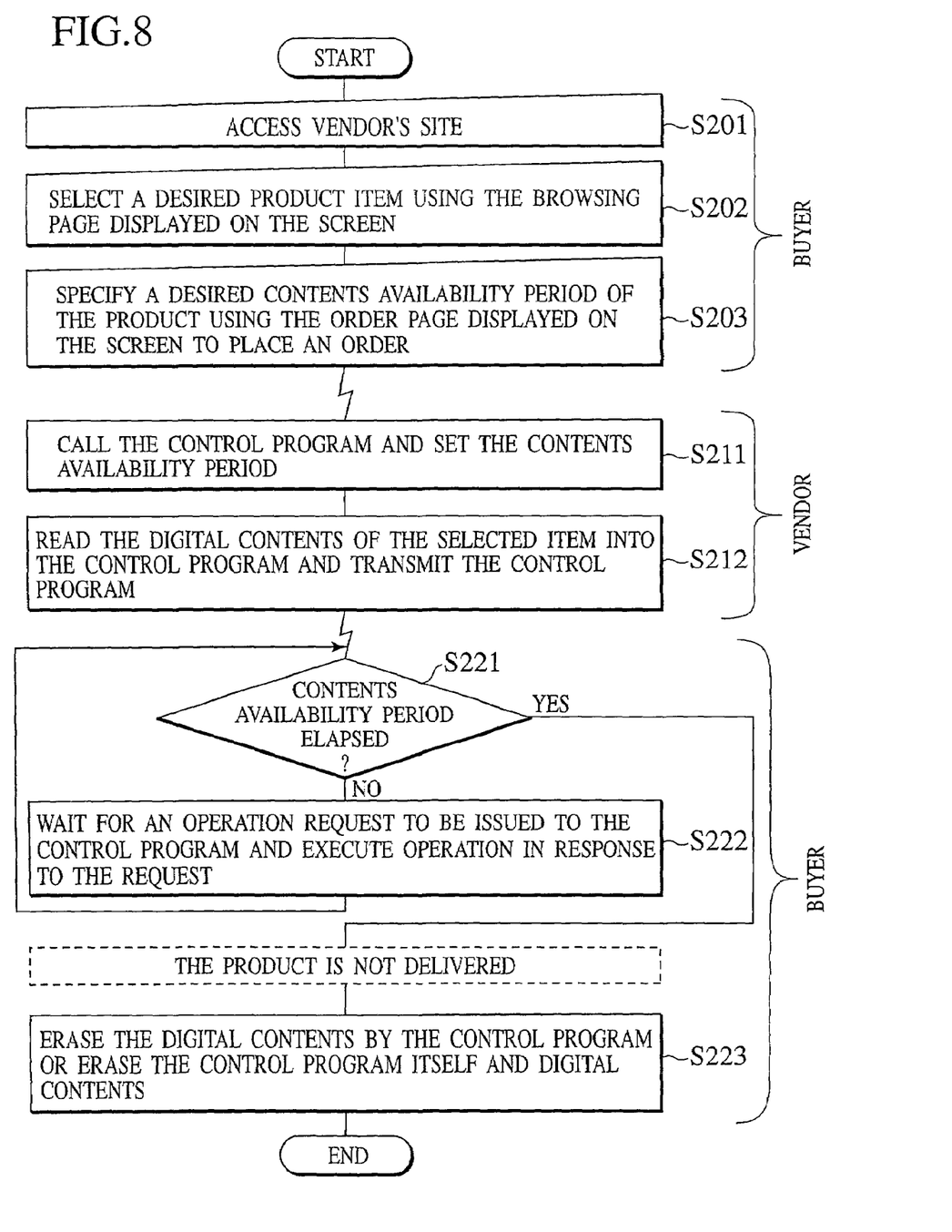
FIG. 8 is a flowchart showing still another example of the operation of the digital distribution system.

In addition, separate systems may be configured for the three methods described above, one for each; that is, a system corresponding to the flowchart in FIG. 2 and the order page in FIG. 5 in which a desired delivery period is specified, a system corresponding to the flowchart in FIG. 6 and the order page in FIG. 7 in which a shipping charge is specified, and a system corresponding to the flowchart in FIG. 8 and the order page in FIG. 9 in which the digital contents are specified. It is also possible to selectively include one or more of those systems into one system.

The client computer 30 is not limited to a desktop personal computer and a notebook personal computer. It may be any other portable data terminals such as a cellular phone or a personal digital assistant (PDA).

In the above embodiments, the present invention is applied to a business dealing in books. The present invention may be applied not only to books and documents but also to general multimedia businesses dealing in music CDs and video DVDs. The present invention makes it possible to start digital distribution where digital contents are delivered and subsequently music CDs and video DVDs are delivered.

As described above, the method according to the present invention incorporates the digital contents, which represents the entity of a product, into a control program controlling the digital contents, transmits the control program from a vendor to a buyer over a network, delivers the product from the vendor to the buyer after a desired delivery period has elapsed since the transmission, and disables the digital contents by the control program after a contents availability period has elapsed. This contents availability period is set, in the control program, to a time longer than the desired delivery period representing a time from the transmission to the delivery. For example, when the present invention is applied to the book business, a buyer receives the digital contents, representing the entity of the book, from a vendor over the Internet immediately after the buyer places an order. This allows the buyer to read the book at the same time the buyer places the order without having to wait for the book to be delivered. At the same time, this method eliminates the need for the vendor to deliver the book as soon as possible, thus reducing the shipping cost. In addition, after the contents availability period, which is set to a time longer than the desired delivery period representing a time from the digital contents transmission to the book delivery, has elapsed, the control program transmitted in conjunction with the digital contents disables the digital contents to enable the vendor to control the termination of the digital contents.

It should be understood that many modifications and adaptations of the invention will become apparent to those skilled in the art and it is intended to encompass such obvious modifications and changes in the scope of the claims appended hereto.

What is claimed is:

1. A digital distribution method comprising the steps of:
   providing a plurality of products for browsing over a network;
   receiving a selection by a product buyer of a desired product from a plurality of browsed products and a shipping charge for delivery of the product;
   receiving an order, from the buyer, for the product over the network;
   incorporating the digital contents representing content of the product into a control program controlling the digital contents;
   transmitting the control program to a computer over the network, thereby allowing access to the digital contents via the computer; and
   sending the product to a physical address specified by the buyer so that the product arrives at the physical address when a required delivery period has elapsed from a time the order is placed, said required delivery period being determined based on said shipping charge;
   wherein the control program erases the digital contents or the control program including the digital contents when a contents availability period has elapsed, said contents availability period being set in said control program and being longer than the required delivery period, thereby terminating the use of the digital contents.

2. The digital distribution method according to claim 1 wherein said control program is transmitted with the digital contents incorporated in such a way that only the control program may process the digital contents and, when the transmission of said control program is completed, the control program starts a time measuring operation of the contents availability period.

3. The digital distribution method according to claim 1 wherein the product includes various books and documents, music CDs, and video DVDs.

4. A digital distribution system comprising a network, a server connected to the network and installed in a product vendor side, and a client computer connected to the network and installed in a product buyer side,
   wherein said server comprises:
   web pages comprising an item browsing page allowing a product buyer to browse a plurality of products over the network for selecting a desired product therefrom and a product order page allowing the product buyer to specify, over the network, a desired delivery period or a shipping charge for a delivery of the selected product and allowing the product buyer to place an order for the selected product;
   digital contents saving means for saving therein digital contents representing content of each product item;
   control program saving means for saving therein a control program which is transmitted with a contents availability period set and the digital contents incorporated at digital contents transmission time, the digital contents representing content of the selected product, wherein the control program erases the digital contents when the contents availability period expires after the transmission, said contents availability period being longer than the desired delivery period or a required delivery period determined based on the shipping charge;
   transmission control means for controlling the transmission of the digital contents, said transmission control means calling the control program from said control program saving means in response to the order from the buyer and incorporating the digital contents, which is read from said digital contents saving means, into said control program for transmission to the buyer over said network; and
   delivery control means for controlling the delivery of the product, said delivery control means delivering the product from the vendor to the buyer when the desired delivery period or the required delivery period has elapsed from the transmission.

5. A digital distribution system comprising a network, a server connected to the network and installed in a product vendor side, and a client computer connected to the network and installed in a product buyer side,
   wherein said client computer comprises:
   a browser allowing web pages prepared in said server to be browsed over the network;

wherein the web pages displayed on a screen of said client computer by said browser comprises;

an item browsing page allowing a product buyer to browse a plurality of products and prompting the product buyer to select a desired product therefrom; and a product order page allowing the product buyer to specify a desired delivery period or a shipping charge for a delivery of the selected product and prompting the product buyer to place an order, wherein digital contents representing content of the ordered product are incorporated into a control program controlling the digital contents in response to the order, transmitted from the vendor to the buyer over the network, and displayed on the screen of said client computer by said browser, and wherein said control program erases said digital contents when a contents availability period set in said control program has elapsed, the contents availability period being longer than the desired delivery period or a required delivery period determined based on the shipping charge.

6. A digital distribution system comprising a network, a server connected to the network and installed in a product vendor side, and a client computer connected to the network and installed in a product buyer side, wherein said server comprises:

web pages comprising an item browsing page allowing a product buyer to browse a plurality of products over the network for selecting a desired product therefrom and a product order page allowing the product buyer to specify, over the network, a desired delivery period or a shipping charge for a delivery of the selected product, and allowing the product buyer to place an order for the selected product, digital contents saving means for saving therein digital contents representing content of each product;

control program saving means for saving therein a control program which is transmitted with a contents availability period set and the digital contents incorporated at digital contents transmission time, the digital contents representing content of the selected product, wherein the control program erases the digital contents when the contents availability period expires after the transmission, said contents availability period being longer than the desired delivery period or than a required delivery period determined based on the shipping charge;

transmission control means for controlling the transmission of the digital contents, said transmission control means calling the control program from said control program saving means in response to the order from the buyer and incorporating the digital contents, which is read from said digital contents saving means, into said control program for transmission to the buyer over said network; and delivery control means for controlling the delivery of the product, said delivery control means delivering the product from the vendor to the buyer when the desired delivery period or the required delivery period has elapsed from the transmission, wherein said client computer comprises:

a browser allowing the web pages to be browsed on a screen over the network;

wherein the digital contents are incorporated into said control program in response to the order, transmitted from the vendor to the buyer over the network, and displayed on the screen of said client computer by said browser, said digital contents representing the content of the selected product ordered by the buyer, and wherein, after the desired delivery period or the required delivery period has elapsed from the transmission and the product is delivered from the vendor to the buyer, said control program stops displaying said digital contents on the screen of the client computer when the contents availability period set in said control program has elapsed.

* * * * *